Jan. 28, 1969  J. N. FISCHER ET AL  3,424,132

HORSE WALKER

Filed Aug. 15, 1966

INVENTORS,
WILLIAM J. MANNING
JACK N. FISCHER

BY Watson, Cole, Grindle & Watson
ATTORNEYS

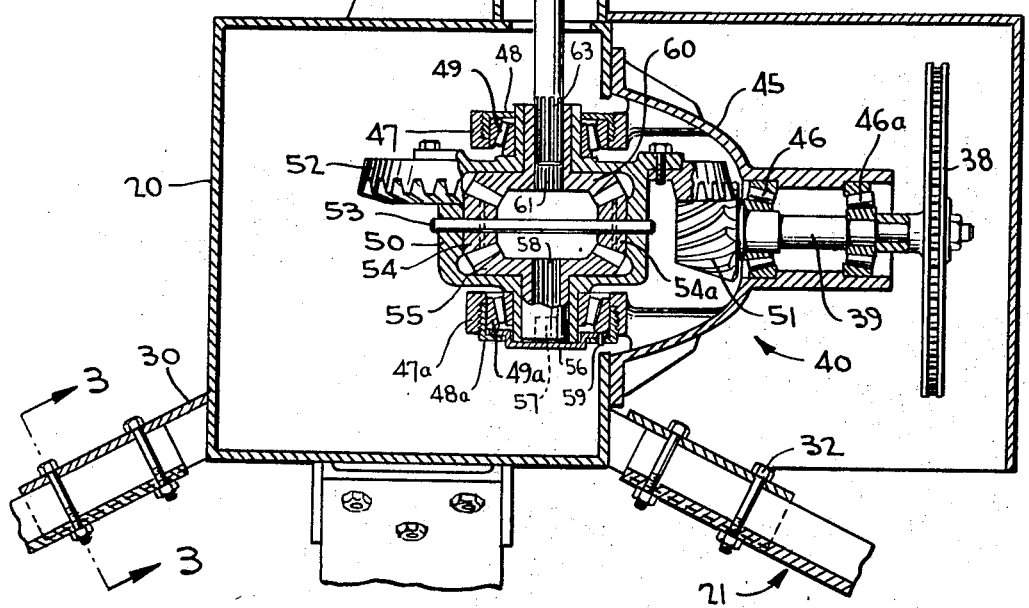

United States Patent Office 3,424,132
Patented Jan. 28, 1969

3,424,132
HORSE WALKER
Jack N. Fischer and William J. Manning, Louisville, Ky., assignors to Bluegrass Engineering & Mfg., Inc., Louisville, Ky., a corporation of Kentucky
Filed Aug. 15, 1966, Ser. No. 572,480
U.S. Cl. 119—29                                             5 Claims
Int. Cl. A01k 15/00

ABSTRACT OF THE DISCLOSURE

A device for exercising horses is provided wherein horizontally extending arms are driven to lead said horses in a closed lead path. Drive means for said arms includes the combination of a slip clutch and a reduction gear means interposed between said slip clutch and said arms, whereby the horse is constantly urged forward under controlled power with activation of the slip clutch requiring sufficient backward force to retard the reduction gear means. Said gear means includes a planetary gearing arrangement and chain means is provided on said slip clutch to positively transfer the power. A stand for the device includes legs extending at 45 degrees and fabricated of channel members with stake means for fastening the stand to the ground.

---

The present invention relates to exercising devices for horses or the like and, more particularly, relates to horse exercising devices which are operative to lead animals along a closed lead path for various purposes.

After running a race, race horses require a cooling out period during which they are exercised at a normal walking gait by an exercise boy to prevent stiffening of the musicles and possible respiratory illness similar to a common cold. Also, it is known in the horse industry that young or inexperienced horses must be broken to a harness, which is usually done by having an exercise boy spend sometimes long periods of time leading the horse by a harness. It is important that the horse be led with authority by the exercise boy to keep him moving at a substantially constant gait to prevent the horse from stopping during a cooling out period and to maintain discipline in the horse when the horse is being trained to a harness.

Heretofore, mechanical devices have been proposed to eliminate the need for the use of exercise boys to perform the above mentioned cooling out or training exercises; but insofar as we are aware, none of these devices has proved to be successful, mainly because no such mechanical device has been proposed wherein there is provided a substantially constant forward force which controllably urges the horse forward thereby closely imitating the function of the exercise boy.

Furthermore, before entrusting valuable race horses or other animals to mechanical devices, the trainers must be assured that the device will not only properly cool out or train the animals but will also prevent injury if the animal should bulk or should fall during the walking period. There has been some effort to accomplish this end result, that is, of preventing injury to the animals in such a device, however, in each of these devices a simple balking force is designed to completely stop the operation, which means that the animals are not properly urged forward with authority to accomplish the desired cooling out or training. In other words, in these prior art devices, the horse need only to stop whereupon it is rendered inoperative and results in an undesirable discontinuance of the operation.

Thus, it is one object of the present invention to provide a horse walker of the type described capable of urging the animal constantly forward under a controlled force while at the same time guarding against injury to said animal.

It is another object of the present invention to provide a horse exercising device which is operative to closely imitate the authority, as well as the safety factor, usually only associated with the use of exercise boys to perform this function.

The device of the invention takes the form of a supporting stand having one or a plurality of horizontally extending arms to which one or more horses are attached to lead the same along a desired closed lead path. In accordance with the invention, the drive means for the arm or arms includes a slip clutch whereby a horse tethered to the end of the arm is constantly urged forward under controlled power in the event that a backward force is exerted on the arm, such as when the horse balks or falls. Thus, this slip clutch is operative to properly perform the walking operation with the required authority while at the same time effectively preventing injury to the horse.

In accordance with another aspect of the present invention, the slip clutch is easily adjusted to vary the speed of rotation of the lead arms, and to properly adjust the device to accommodate any number or size of horses for any of the purposes described so that the controlled power with which the animals are urged forward can be accurately and closely regulated under any circumstances. Further, construction of the mounting stand is rugged and particularly adapted for use with powerful animals, such as horses, and the stand includes features that allow the same to be easily adjusted or dismantled when desired.

According to another feature of the present invention, the horse walker device includes a speed reducing apparatus that includes a ring gear and pinion unit interposed between the slip clutch and the driven arms so that even a backward force exerted by the animal sufficient to rotate the arms in the backward direction is allowed without injury to the horse and without putting undue strain on the walker device. This arrangement also accomplishes the result of preventing direct transmission of the backward force to the slip clutch thereby preventing any insignificant or slight balking action from activating said slip clutch. Further, in the preferred embodiment illustrated, this speed reducing apparatus includes a carrier unit with opposed planet gears working against a fixed sun gear. This results in a powerful yet controlled driving force being transmitted to the lead arms by a relatively small electric motor; the gearing arrangement having inherent strength and stability to accommodate said powerful driving force.

Accordingly, it is another object of the present invention to provide a horse exercising device wherein a slip clutch is utilized to controllably urge the horses forward, which slip clutch is adapted to be quickly and easily regulated by simple adjustment means.

It is still a further object of the present invention to provide a horse exercising device wherein the mounting stand is of simple construction and is easily adjusted and assembled or disassembled.

It is another object of the present invention to provide a horse walker having a speed reducing apparatus to properly lead the animals at the desired gait and to allow backward movement of the lead arms if necessary.

It is another object of the present invention to provide a horse walker device comprising a single electric motor and an inherently rugged speed reducing apparatus combination to automatically and safely exercise a number of horses, which device therefore is relatively simple in construction and requires a minimum amount of maintenance.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments, and its several details are capable of modification in various obvious respects, all without departing from the invention. Accordingly, the drawings and description are to be regarded as illustrative in nature, and not as restrictive.

In the drawings:

FIGURE 2 is a sectional view taken along the centerline of the device of FIGURE 1 showing the main speed reducing unit of the invention;

FIGURE 3 is a cross-sectional view taken along line 3—3 of FIGURE 2 showing the removable mounting of the supporting legs; and FIGURE 4 is a cross-sectional view showing the details of a slip clutch used in the preferred embodiment of the invention.

Figure 1:
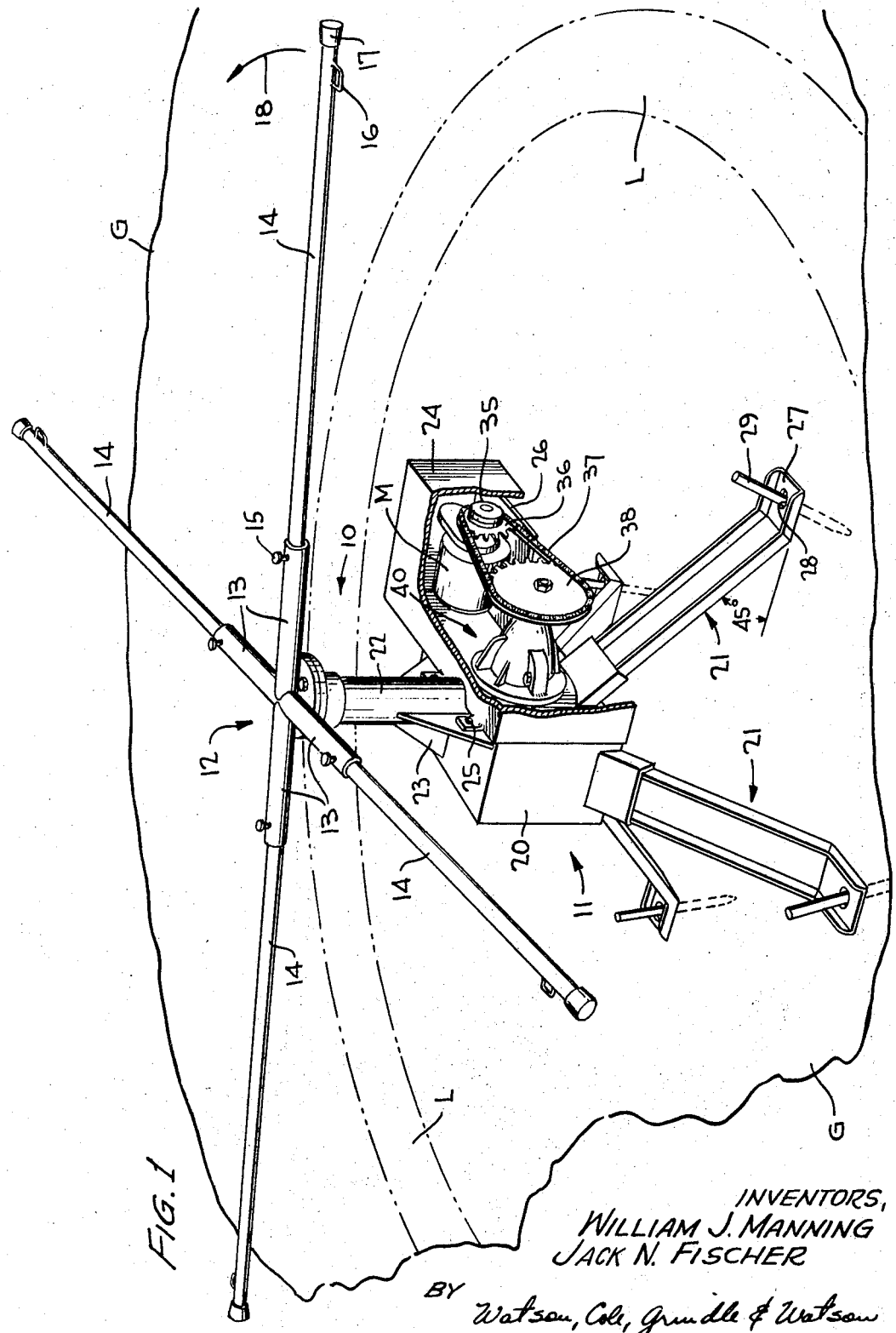
FIGURE 1 is an overall perspective view of the horse walker of the present invention with certain parts broken away for a better view.

Referring now to FIGURE 1 of the drawings for a more specific description of the invention, there is illustrated a horse walker, generally designated by the reference numeral 10 and constructed in accordance with the teachings of the present invention, which horse walker 10 includes a composite mounting stand 11 supporting a wheellike structure 12 for rotation about a vertical axis. In the preferred embodiment illustrated for the purposes of disclosing the invention, the wheel 12 includes a plurality of radially extending tubular sockets 13, which sockets 13 are adapted to telescopically receive outwardly extending arms 14 in the manner indicated. A suitable locking screw 15 is provided on each of the sockets 13 to adjustably position the sweep of the arms 14 in relation to the vertical axis of the walker 10. At the free end of each of the arms 14 there is provided a fastening loop 16 and a protective end cap 17, which aids in preventing injury to the horse or the operator of the walker 10. The fastening loop 16 is preferably welded to the outer surface of the arm 14 and said arm 14 is preferably of tubular construction for economy, although it is to be understood that other equivalent structures could, of course, be used.

The loop 16 is designed to receive the lead line of the horse to be exercised, and it should be clear that a horse or horses tethered to the loops 16 will be led in a circular, closed lead path L that proceeds in a counterclockwise direction, as indicated by the arrow 18, upon energizing the electric drive motor unit M. The circular lead path L for the tethered horses can be adjusted in a limited fashion by releasing of the locking nut 15 and repositioning the arm 14 as desired within the sockets 13 of the rotating wheel 12. Also, it is contemplated that the arms 14 are desirably adapted for limited lateral flexure along their longitudinal axis to accommodate a certain amount of opposing force that might be transmitted to the walker 10 by a tethered horse.

The mounting stand 11 is preferably fabricated from heavy gauge steel for strength as well as stability during operation and comprises a gear box 20 to which are attached any number of outwardly extending legs for support, said legs being generally designated by the reference numeral 21. Extending upwardly from the gear box 20 is an axle mounting housing 22 which has appropriate gusset members 23 fastened to the top of said gear box 20 for support.

The motor unit M is conveniently mounted within a removable enclosure 24 which is attached to the gear box 20 by suitable mounting tabs 25. The enclosure 24 affords weather protection for said motor unit M and the associated drive mechanism to be discussed later, and preferably said enclosure 24 includes a floor 26 to which the motor M is suitably attached so that the motor M becomes an integral part of the enclosure 24 and more completely protected thereby.

As mentioned, the mounting stand 11 is advantageously constructed of relatively heavy material and as illustrated in FIGURE 1 is of low center of gravity so that the same is not easily turned over by animals attached thereto. The legs 21 are formed of suitable channel members and preferably extend at an angle of approximately 45° with respect to the level ground or other mounting surface G for stability, as indicated in this figure. In normal use, the horse walker 10 would be used on the level ground G, and for the purpose of securely attaching the same thereto the legs 21 include feet 27, each having an aperture 28 through which a suitable stake 29 is adapted to be driven at an angle to further insure that said stand 11 is maintained upright during operation.

As can be seen from viewing FIGURES 1–3 of the drawings, the entire walker 10 is adapted to be easily assembled and disassembled when desired. More particularly, it is evident that the wheel 12, the arms 14 and the enclosure 24 are removable, and in addition, the legs 21 are adapted to be removed from the gear box 20, as shown in FIGURES 2 and 3, whereby the horse walker 10 can be easily stored or transported. The preferred construction for removably mounting the legs 21 consists of channel-shaped sockets 30 that extend outwardly from the gear box 20 at an angle of approximately 45° for receiving in an interfitting fashion the smaller channel-shaped legs 21 for attachment by any number of suitable bolts 32, as clearly shown in these figures. For increased strength and rigidity of the joint, the legs 21 are preferably placed in said sockets 30 so as to form a box section as illustrated in FIGURE 3, with the bolts 32 extending through the box section for added rigidity.

The transmission of the driving power from the electric motor unit M to the rotating wheel 12 includes a slip clutch 34 mounted on the output shaft 35 of the motor unit M, said slip clutch 34 being operative to contrallably drive a first sprocket 36. In turn, through a suitable chain 37 said sprocket 36 is effective to drive a second sprocket 38 mounted on an input drive shaft 39, as illustrated in FIGURE 1. It is noted at this point that the electric motor unit M may be provided with a built-in speed reducer and the second sprocket 38 may be selected to be larger than the first sprocket 36 in order to obtain a preliminary speed reduction in this stage of the transmission of power from the motor unit M; however, it is contemplated by this invention that a substantial speed reduction is accomplished in a preferred embodiment speed reduction unit 40 mounted within the gear box 20 and driven by the input shaft 39 (note FIGURES 1 and 2).

Thus, with reference to FIGURE 2 of the drawings, it can be seen that the support casing 45 of the unit 40 serves to mount inner and outer bearings 46, 46a, respectively, to rotatably position the input shaft 39. Further, the casing 45 includes inwardly extending upper and lower support brackets 47, 47a, respectively, including threaded sleeves 48, 48a for retaining upper and lower bearings 49, 49a, respectively, which serve to support gear carrier housing 50 at a 90° angle with respect to the input shaft 39.

The input shaft 39 has mounted on its inner end a pinion 51 which meshes with a ring gear 52 that is supported by and serves to rotate the carrier housing 50. A cross shaft 53 extends diametrically across said carrier housing 50 and supports near its ends a pair of planet gears 54, 54a, which are meshed with a stationary sun gear 55 held against rotation by a locking plate 56 having a splined projection 57 adapted to fit in the splined center bore 58 of said sun gear 55. The locking plate 56 is in turn held against rotation by a suitable pin 59 that cooperates with the threaded locking sleeve 48a.

In opposed relationship to the stationary sun gear 55 is an output gear 60 rotatably journaled in the upper portion of the carrier housing 50 and meshing with the planet gears 54, 54a so as to be capable of being driven by the same. A splined bore 61 is provided in the output gear 60 which receives an upstanding drive axle 62 at a splined end 63 thereof. As shown, the drive axle 62 is supported at its upper end by a suitable bearing 64 mounted within a sealing cap 65, and said drive axle 62 carries a drive plate 66 to which the wheel 12 is attached by any number of suitable fasteners 67.

In operation, the gears in the speed reduction unit 40 can be easily followed by viewing FIGURE 2 wherein it can be seen that the pinion 51 of the input shaft 39 drives the ring gear 52 and the carrier housing 50 and through the cross shaft 53 the planet gears 54, 54a are caused to rotate as a result of their engagement with the stationary sun gear 55 whereupon the output gear 60 and the axle 62 are driven. It is important to note that this speed reduction unit 40 is of a very rugged construction and is capable of transmitting substantial amounts of torque which might be needed for leading large animals, such as horses, particularly if the animals tend to resist the leading operation. Further, it is clear that the speed reduction unit 40 allows retrograde or backward movement of the wheel 12 without injuring the horse and without putting undue strain on the components.

If additional protection is found to be necessary to protect particularly lively or unruly animals as well as protection for the components of the reduction unit 40, the pin 59 may be designed as a shear pin so that if an unusually large torque ever occurs, the sun gear 55 is released and the walker 10 rendered inoperative until the pin 59 is replaced. A further modification of the reduction unit 40 that may be desired involves increasing the reduction ratio by pinning or locking (by a shear pin, if desired) the carrier housing 50 to the sun gear 55 whereupon all of the drive gears in the carrier housing 50 are locked together and the transmission of power proceeds directly from the pinion 51 through the ring 52 to the drive axle 62. For example, the reduction ratio of such a modification would be approximately 8:1; whereas, the reduction ratio is only approximately 2:1 in the particular reduction unit 40 shown in the drawings for the purpose of disclosing the present invention.

With reference now to FIGURE 4 of the drawings, there is shown a preferred embodiment of the slip clutch 34 that can be used with the horse walker 10 of the present invention. As well illustrated in this figure, the slip clutch 34 is directly mounted on the output shaft 36 of the motor unit M and comprises a cylindrical body 70 having a peripheral shoulder 71 at the inner end of said body and a threaded portion 72 at the outer end thereof; said body 70 being fixed for rotation with said output shaft 35 by a key 73 and positioned axially thereon by a positioning screw 74. The sprocket 36 is mounted on a resilient spacer pad 75 and has in engagement with its opposite faces, a pair of resilient frictional drive pads 76, 76a. These drive pads 76, 76a are urged into friction driving relationship with said sprocket 36 by metal pressure plates 77, 77a, respectively, and to apply the necessary pressure to said plates 77, 77a a cup-shaped spring washer 78 acting against shoulder 71 and an adjusting plate 79 threaded on portion 72 of the body 70 are provided.

As shown in this figure, the angular position of said adjusting plate 79 is fixed by a set screw 80 cooperating with a slot 81 on said body 70 and said adjusting plate 79 carries any number of adjusting screws 82, which are operative to supply in combination with the cup spring 78, accurately controllable frictional driving engagement between the friction pads 76, 76a and the sprocket 36. It will be readily understood that adjustment of the screws 82 to increase the pressure on the friction pads 76, 76a results in an increased driving torque being transferred to the sprocket 36 and that withdrawing the screws 82 for relaxing of the pressure serves to lessen the driving torque transmitted.

To consider the overall operation of the horse walker 10, when the motor unit M is energized the wheel 12 and the radially extending arms 14 will be driven in the direction of the arrow 18, as noted in FIGURE 1, which driving will be accomplished through both the slip clutch 34 and the speed reduction unit 40. If a horse is being led along the lead path L by the horse walker 10 and balks, the slip clutch 34 will prevent injury to the horse or a strain on the horse walker 10 by slippage between the driving pads 76, 76a and the side faces of the sprocket 36. At the same time, tension will be maintained on the lead arms 14 through the gear reduction unit 40 by said slip clutch 34 whereby the horse will be urged forward with authority but without the possibility of causing injury to the horse.

It is to be understood that the slip clutch 34 is adjusted by the adjusting screws 82 to transmit the appropriate drive torque to the radial arms 14 in accordance with the number and size of horses being exercised. In most cases this adjustment is such as to allow the operator to completely stop the operation of the horse walker 10 by merely placing his shoulder against one of the lead arms 14 thereby causing slippage in the slip clutch 34 whereby he can attach or remove horses during the operation as desired.

Further, it will be realized that the slip clutch 34 can be advantageously used to reduce and thus to adjust the speed of the horse walker 10 by merely loosening the adjusting screws 82 until the normal resistance of the walker 10 causes the driving engagement between the friction pads 76, 76a and the side faces of the sprocket 36 to constantly slip to a desired degree. In this mode of operation, it is noted that the safety factor is still present since upon a backward force being placed on the lead arms 14, additional slippage between the sprocket 36 and the drive pads 76, 76a is allowed, and, as before, the walker 10 may even be brought to a halt or rotated in the backward direction thereby protecting the horses and the components of the device of the invention.

In this disclosure, there is shown and described only the preferred embodiment of the invention, but, as aforementioned, it is to be understood that the invention is capable of various changes or modifications within the scope of the inventive concept as expressed by the accompanying claims.

We claim:

1. An exercising device for horses comprising a mounting stand, an upwardly extending axle journaled for rotation on said stand, lead means connected to said axle including at least one lead arm extending radially outward from said axle, drive means for said axle to move said lead means in a horizontal plane whereby a horse attached to the free end of said arm is normally led forward along a closed lead path, said drive means including a slip clutch whereby said horse is constantly urged forward under controlled power when a backward force is exerted on said arm, reduction gear means interposed between said axle and said slip clutch and interconnecting means between said slip clutch and said reduction gear means, whereby said slip clutch is capable of being activated by a backward force sufficient to retard said reduction gear means to positively control said slip clutch through said interconnecting means.

2. The combination of claim 1 wherein said reduction gear means includes a ring gear connection to said axle, and a pinion for driving said ring gear, and said drive means further includes an electric motor for driving said pinion, said slip clutch being interposed between said pinion and said motor whereby said backward force is capable of being transferred to said slip clutch while the driving power from said electric motor through said reduction gear means is multiplied.

3. The combination of claim 2 wherein said gear reduction means further includes a carrier unit connected to said ring gear for rotation therewith, said carrier unit comprising a sun gear, means for fixing said sun gear with respect to said stand, planet gear means fixed for bodily rotation with said carrier unit and meshed with said fixed sun gear and a drive gear on said axle meshed with said planet gears and in opposed relationship to said sun gear, whereby said axle is positively driven through said carrier unit.

4. The combination of claim 2 wherein said pinion fixedly carries a driven sprocket for rotation therewith and the output shaft of said motor rotatably carries a drive sprocket to allow relative rotation with respect thereto, said interconnecting means including a chain interconnecting said sprockets, said slip clutch comprising a pair of friction surfaces fixedly carried by said output shaft and drivingly engaging the opposed faces of said drive sprocket, whereby said backward force is positively transferred to said slip clutch to insure slippage only at said friction surfaces for controlled results.

5. The combination of claim 4 wherein said slip clutch is provided with adjustable means for regulating the engaging force of said friction surfaces against said sprocket whereby the controlled power for urging said animal forward can be regulated.

References Cited

UNITED STATES PATENTS

| | | | |
|---|---|---|---|
| 2,433,807 | 12/1947 | Bartlett | 272—40 |
| 2,489,438 | 11/1949 | Schrader | 119—29 |
| 2,684,109 | 7/1954 | Youmans. | |
| 2,765,168 | 10/1956 | Taylor | 272—41 |
| 2,831,457 | 4/1958 | McMurry | 119—29 |
| 3,201,953 | 8/1965 | Firth | 64—30 |

FOREIGN PATENTS 683,635  12/1952  Great Britain.

HUGH R. CHAMBLEE, *Primary Examiner.*

U.S. Cl. X.R.

272—39